(12) United States Patent
Gao et al.

(10) Patent No.: US 11,978,568 B1
(45) Date of Patent: May 7, 2024

(54) METHOD FOR STABILIZING NEUTRALIZATION SLAG OF URANIUM ASSOCIATED ZIRCONIUM AND ZIRCONIA, AND STABILIZATION AGENT USED THEREIN

(71) Applicant: The Fourth Research and Design Engineering Institute of China National Nuclear Corporation, Shijiazhuang (CN)

(72) Inventors: Yang Gao, Shijiazhuang (CN); Juan Sun, Shijiazhuang (CN); Yifu An, Shijiazhuang (CN); Guoxi Lian, Shijiazhuang (CN); Xuyang Wu, Shijiazhuang (CN)

(73) Assignee: THE FOURTH RESEARCH AND DESIGN ENGINEERING INSTITUTE OF CHINA NATIONAL NUCLEAR CORPORATION, Shijiazhuang (CN)

( * ) Notice: Subject to any disclaimer, the term of this patent is extended or adjusted under 35 U.S.C. 154(b) by 0 days.

(21) Appl. No.: 18/239,313

(22) Filed: Aug. 29, 2023

(30) Foreign Application Priority Data

Nov. 18, 2022 (CN) .......................... 202211448191.9

(51) Int. Cl.
| | |
|---|---|
| *G21F 9/30* | (2006.01) |
| *B09B 3/70* | (2022.01) |
| *B09B 101/55* | (2022.01) |
| *C04B 12/00* | (2006.01) |
| *C04B 14/04* | (2006.01) |
| *C04B 111/00* | (2006.01) |

(52) U.S. Cl.
CPC ................ *G21F 9/304* (2013.01); *B09B 3/70* (2022.01); *C04B 12/00* (2013.01); *C04B 14/042* (2013.01); *B09B 2101/55* (2022.01); *C04B 2111/00767* (2013.01)

(58) Field of Classification Search
CPC ....... B09B 3/70; B09B 2101/55; C04B 12/00; C04B 14/042; C04B 2111/00767; G21F 9/304
See application file for complete search history.

(56) References Cited

FOREIGN PATENT DOCUMENTS

| | | | |
|---|---|---|---|
| CN | 109092878 A | * | 12/2018 |
| JP | 61191999 A | * | 8/1986 |
| JP | 2002006087 A | * | 1/2002 |

\* cited by examiner

*Primary Examiner* — Anthony J Green
(74) *Attorney, Agent, or Firm* — WPAT. P.C

(57) ABSTRACT

A method for stabilizing a neutralization slag of uranium associated zirconium and zirconia, and a stabilization agent used therein are disclosed. The stabilization agent includes the following components in parts by weight: a pretreatment agent of 2-8 parts, anhydrous calcium chloride of 2-6 parts, an adsorbent of 3-5 parts and a stabilizer of 4-9 parts. The stabilization agent is used to stabilize the uranium that is existed in the neutralization slag in a waste slag. The method includes the following steps: the pretreatment agent is used to alkalize and disperse the neutralization slag; soluble calcium salt is added to cement the neutralization slag; and the adsorbent and the stabilizer are used as a composite material to passivate the neutralization slag. The method has low cost, fast effectiveness, simple process, easy operation, and long-term stable remediation efficiency, which can be applied to the treatment and disposal of associated radioactive waste residues.

7 Claims, 3 Drawing Sheets

METHOD FOR STABILIZING NEUTRALIZATION SLAG OF URANIUM ASSOCIATED ZIRCONIUM AND ZIRCONIA, AND STABILIZATION AGENT USED THEREIN

TECHNICAL FIELD

The disclosure relates to the technical field of stabilization treatment technology for radioactive waste residue and particularly to a method for stabilizing neutralization slag of uranium associated zirconium and zirconia, and a stabilization agent used therein.

BACKGROUND

Zirconium and zirconia have been widely used in various fields such as ceramics, refractory materials, machinery, optical fiber communication, aerospace, biology, etc. due to their excellent physical and chemical properties. The production of zirconium chemical products in China ranks first in the world, and the annual production of zirconium oxychloride as an intermediate raw material has reached 200000 tons. In China, the production of zirconium oxychloride mostly adopts the alkali fusion process (one acid one alkali method), which has the drawback of producing a large amount of alkaline wastewater and zirconium silicon slag. According to statistics, approximately 6 tons of alkaline wastewater and 0.5 tons of zirconia slag are generated for every 1 ton of zirconium oxychloride production. Among them, the alkaline wastewater mainly consists of sodium silicate and sodium hydroxide. The zirconium silicon slag is an acidic slag, mainly composed of silicic acid slag ($mSiO_2 \cdot nH_2O$).

Zirconium is often associated with uranium and is accompanied by the migration, concentration, and diffusion of nuclide uranium during the selection, mining, and processing. Lu Jigen conducts uranium content tests on the raw materials, finished products, and waste of zirconium oxychloride production. Except for the finished products, both the raw materials and waste contain certain levels of radioactivity. Lin Zhenhan analyzes the direction and distribution of uranium in the alkali fusion production process, and finds that uranium is mainly distributed in the residual solution of zirconium oxychloride crystallization, alkaline wastewater, and zirconium silicon slag.

A large amount of alkaline wastewater and zirconium silicon slag cannot be directly discharged. If not treated properly, the alkaline wastewater and zirconium silicon slag will cause serious pollution to the factory and surrounding ecological environment, which also leads to high production costs for enterprises. To solve this problem, most production enterprises adopt a comprehensive recovery and neutralization treatment technology, which uses the alkaline wastewater and zirconium silicon slag to neutralize and prepare white carbon black, allowing the alkaline wastewater and waste residue (zirconium silicon slag) to be reused. However, this technology method will generate a certain amount of neutralization waste residue and cause the concentration of nuclides in the neutralization slag. Due to the lack of qualifications and disposal methods for radioactive nuclides in the production enterprises, most of the waste residue is currently stored in their own temporary storage warehouses, with limited capacity, which seriously restricts the expansion of production by the production enterprises.

Raw materials of zirconium and zirconia undergo alkali fusion, acid conversion, and neutralization treatment, resulting in highly reactive neutralizing slag. Uranium is less affected by potential of hydrogen (pH), and in addition, the crystal structure of the waste residue obtained after alkali fusion acid treatment is severely damaged. A large amount of residual uranium is released and transformed into a transportable state, exacerbating the risk of uranium leaching release. According to "Technical specifications of radiation environmental protection for other radioactive material's storage and solid waste's landfill (Trial)" (HJ 1114-2020), pretreatment such as neutralization and stabilization should be carried out before the landfill of associated radioactive solid waste to reduce the leaching performance of radioactive nuclides. The pH index of the neutralization slag meets the requirements, but uranium still needs to be stabilized.

For the stabilization of uranium, existing remediation methods include physical, chemical, and biological remediation methods. Physical remediation often uses solidification and embedding treatment methods, which increase the capacity of waste residue and have high costs, and are often used to treat high-level radioactive waste. Bioremediation includes plant and microbial remediation, which has a long remediation cycle and is often used for the remediation of uranium pollution in soil and water bodies. The associated waste residue is slag, which has poor biological growth conditions and low remediation efficiency. Chemical remediation includes reduction and ligand complexation, with zero valent iron as the main remediation material. During the reduction process, the leaching solution is mostly cherry red, which is difficult to meet emission requirements. Other reducing materials such as sodium sulfide and sodium sulfite are prone to release toxic gases such as $SO_2$ and $H_2S$, and uranium is easily re-oxidized and released during long-term storage. Phosphate is often used as the main repair material for ligand complexation, while common phosphates and hydrogen phosphates have no stabilizing effect on neutralizing slag of zirconium and zirconia.

At present, there is no stabilizing agent and corresponding usage method for stabilizing neutralizing slag of uranium associated zirconium and zirconia. Therefore, it is an urgent demand in the field of treatment and disposal of neutralizing slag of zirconium and zirconia to develop an environmentally friendly, low-cost, and widely applicable stabilization agent and the use method for neutralization slag.

SUMMARY

The purpose is to provide a method for stabilizing neutralization slag of uranium associated zirconium and zirconia, and stabilization agent used therein. The method has the advantages of environmental friendliness, low cost, and can be widely applied, providing a new solution for the stabilization treatment and disposal of neutralization slag of zirconium and zirconia.

The technical schemes of the disclosure are achieved as follows. A method for stabilizing the neutralization slag of uranium associated zirconium and zirconia includes the following steps:

Step 1: a pretreatment agent is used to alkalize and disperse the neutralization slag. The pretreatment agent is put into the neutralization slag and stirred evenly for 5-10 minutes (min) to obtain a first mixture, water with a weight of 15%-25% that of the neutralization slag is added into the first mixture and stirred for 10-20 min to obtain a mixed mud, then a potential of hydrogen (pH) of the mixed mud is detected. The mixed mud is maintained for 30 min and then step 2 is executed when the pH of the mixed mud exceeds 8.5; or step 1 is repeated until the pH exceeds 8.5 when the pH is less than or equal to 8.5. The pretreatment agent is a second mixture formed by mixing lime and a nano active material according to a set ratio.

Step 2: a soluble calcium salt is added to cement the neutralization slag. Anhydrous calcium chloride is added into the mixed mud obtained from step 1 and stirred for 10-20 min, water is sprinkled on the mixed mud added with the anhydrous calcium chloride to obtain a cemented mud with a moisture content of 15% to 25%, the cemented mud has an enhanced cementation ability. The pH of the cemented mud is controlled in a range of 7.5-8 (adding the anhydrous calcium chloride can decrease the pH, and the anhydrous calcium chloride no longer has any effect when the pH below 7.5. At this point, the anhydrous calcium chloride is stopped to add. Therefore, the meaning of "control" is to add the anhydrous calcium chloride and stop the addition of the anhydrous calcium chloride when the pH drops to the range) and then the cemented mud is maintained for 30 min.

Step 3: an absorbent and a stabilizer are used as a composite material to passivate the neutralization slag. Phosphoric acid modified sepiolite and dihydric phosphate are added into the cemented mud, stirred for 10-20 min and maintained for 30 min, followed by performing pressure filtering to stabilize the neutralization slag.

In an embodiment, the nano active material in step 1 includes silica fume, volcanic ash, kieselguhr or amorphous silica ($SiO_2$) The set ratio of the lime to the nano active material is 1:1, 2:1 or 3:1.

In an embodiment, the nano active material is silica fume. The set ratio of the lime to the nano active material is 1:1.

A preparation method of the phosphoric acid modified sepiolite as the absorbent in step 3 is as follows: the sepiolite powder grinded to 200 meshes is add into a phosphoric acid solution of 5%-10% volume of fraction, with a solid-liquid ratio of 1:50 gram per milliliter (g/mL), the phosphoric acid solution added with the sepiolite powder is stirred for 30 min until bubbles completely disappear, then the phosphoric acid solution is aged for 60 min and a supernatant is filtered out to obtain a first solid, then the first solid is added into deionized water, then stirred and dispersed for 20 min to obtain a solution. One or more of the alkaline material such as ammonia water, KOH, and lime water is used to adjust the pH to a range of 3.25 to 6, then the solution is stood for 30 minutes, a supernatant is filtered out to obtain a second solid, and the second solid is dried and refined to obtain the phosphoric acid modified sepiolite.

In an embodiment, the alkaline material is ammonia water, and the pH of the ammonia water is adjusted to a range of 4 to 5. The result of the refining is passing through a mesh sieve about 100 mesh.

The dihydric phosphate as the stabilizer in step 3 is at least one of potassium dihydric phosphate, calcium biphosphate and ammonium dihydric phosphate. In an embodiment, the dihydric phosphate is the potassium dihydric phosphate.

In an embodiment, the stabilization agent includes the pretreatment agent in step 1, anhydrous calcium chloride in step 2, and phosphoric acid modified sepiolite and dihydric phosphate in step 3. And a weight ratio of the pretreatment agent in step 1:the anhydrous calcium chloride in step 3:the phosphoric acid modified sepiolite in step 4:the dihydric phosphate in step 4 is 2-8:2-6:3-5:4-9. And a weight ratio of the pretreatment agent and the neutralization slag of uranium associated zirconium and zirconia is 2-8:100.

In an embodiment, the pretreatment agent is a mixture formed by mixing lime and a nano active material according to the set ratio (1:1, 2:1, or 3:1). In a specific embodiment, the nano active material is silica fume, volcanic ash, diatomaceous earth, or amorphous $SiO_2$. In a specific embodiment, the nano active material is silica fume, with a weight ratio of 1:1 between the lime and the nano active material.

In an embodiment, the dihydric phosphate is at least one of potassium dihydric phosphate, calcium biphosphate and ammonium dihydric phosphate. In a specific embodiment, the dihydric phosphate is the potassium dihydric phosphate.

The beneficial effects of the disclosure are as follows.

The disclosure utilizes the pretreatment agent (including the lime and the nano active material), the soluble calcium salt (the anhydrous calcium chloride), the absorbent (the phosphoric acid modified sepiolite) and the stabilizer (the potassium dihydric phosphate) to form the stabilization agent, uranium is induced to form a insoluble uranium, and the insoluble uranium is stabilized in the neutralization slag through gradually adding the above materials and synergy-cementation-adsorption-mineralization, finally the long-term effective control of the radioactive waste slag is realized. After stabilization, a concentration of the uranium in a leaching solution of the waste slag is less than 0.1 mg/L, the removal rate is more than 97.0%, and the remediation efficiency is high.

The disclosure is used as the stabilization agent for stabilizing the neutralizing slag of uranium associated zirconium and zirconia. The basic components are cheap and easy to obtain, the preparation process is simple, the use conditions are simple, easy to control, and the practicality is strong.

DETAILED DESCRIPTION OF EMBODIMENTS

Figure 1:
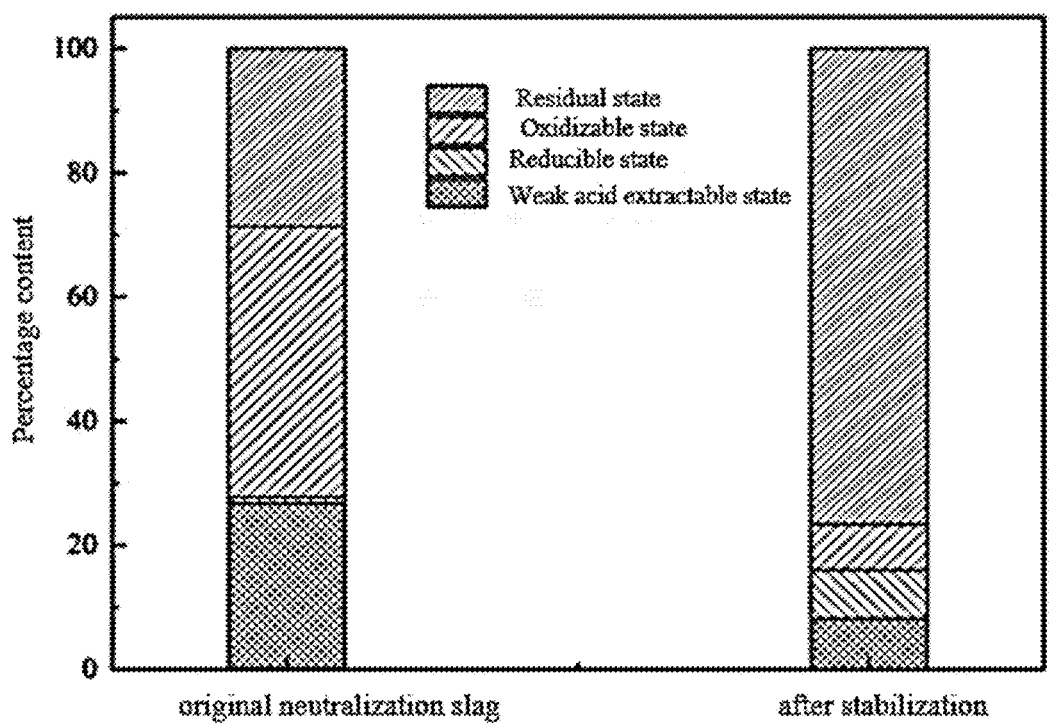
FIG. 1 illustrates a schematic view showing a change in occurrence form of uranium before and after stabilization of neutralization slag of zirconium and zirconia in an embodiment 1 of the disclosure.

The following provides a further detailed explanation of the content of the disclosure through specific embodiments. The raw materials, reagents, and devices used in the embodiments can be obtained from conventional commercial channels unless specified. The experimental or testing methods are conventional methods in this field.

A preparation method of the phosphoric acid modified sepiolite is as follows: sepiolite powders are grinded to 200 meshes and 100 mL (V/V=5%-10%) of a phosphoric acid solution is prepared. 2 grams (g) of the sepiolite powders with 200 meshes are added into a triangular flask containing 100 mL of the phosphoric acid solution, stirred with a magnetic stirrer at room temperature for 30 minutes until the bubbles completely disappear, then sealed and aged for 60 min, the supernatant is filtered out to obtain a first solid, the first solid is add into 100 mL of deionized water, stirred and dispersed for 20 min to obtain a solution, ammonia water is used to adjust the pH of the solution to a range of 4.5±0.5. The solution is stood for 30 min and a supernatant is filtered out to obtain a second solid, then the second solid is dried and refined to 100 meshes to obtain the phosphoric acid modified sepiolite.

Embodiment 1

20 g of the pretreatment agent (consisting of 10 g of lime and 10 g of nano silica fume) are added into 1000 g of neutralization slag of zirconium and zirconia and stirred evenly for 5 min to obtain a first mixture, then 150 mL of water is added to the first mixture and stirred for 10 min to obtain a mixed mud with a pH of 8.8, and the mixed mud is maintained for 30 min. After the maintaining of the mixed mud, 20 g of anhydrous calcium chloride are added to the mixed mud and stirred for 10 min, 20 mL of water is sprinkled on the mixed mud added with the anhydrous calcium chloride to obtain a cemented mud with an enhanced cementation ability, and a pH of the cemented mud is 7.5, and the cemented mud is maintained for 30 min After the maintaining of the cemented mud, 30 g of the phosphoric acid modified sepiolite and 40 g of potassium dihydric phosphate are added into the cemented mud and stirred for 10 min, then the cemented mud added with the phosphoric acid modified sepiolite and the potassium dihydric phosphate is maintained for 30 min, followed by performing pressure filtering to stabilize the neutralization slag.

The neutralization slags before and after the stabilization are respectively sampled and tested, and a toxicity leaching experiment is carried out. A uranium concentration and a pH value of the leaching solution are shown in Table 1. Water leaching and acid leaching refer to "Solid waste-Extraction procedure for leaching toxicity-Horizontal vibration method" HJ 557-2010 and "Solid waste-Extraction procedure for leaching toxicity-Sulphuric acid & nitric acid method" HJ 299-2007, respectively. It can be seen from Table 1, before the stabilization, the concentration of uranium in the water leaching is 1.055 milligrams per liter (mg/L) with the pH of 8.0, and the concentration of the uranium in the acid leaching is 1.213 mg/L with the pH of 7.9. After the stabilization, the concentration of the uranium in the water leaching is 0.024 mg/L with the pH of 7.8, the concentration of the uranium in the acid leaching is 0.036 mg/L with the pH of 7.6, and a remediation efficiency of the uranium is more than 97.0%.

The occurrence form of uranium after stabilization is shown in FIG. 1, it can be seen that the proportion of weak acid extractable uranium is decreased by 18.55%, the proportion of oxidizable state is decreased by 36.12%, the proportion of reducible state is increased by 6.71%, and the proportion of residual state is increased by 47.96%.

Embodiment 2

400 g of the pretreatment agent (consisting of 200 g of lime and 200 g of nano silica fume) are added into 5000 g of neutralization slag of zirconium and zirconia and stirred evenly for 10 min to obtain a first mixture, then 1250 mL of water is added to the first mixture and stirred for 20 min to obtain a mixed mud with a pH of 9.3, and the mixed mud is maintained for 30 min. After the maintaining of the mixed mud, 300 g of anhydrous calcium chloride are added to the mixed mud and stirred for 20 min, 150 mL of water is sprinkled on the mixed mud added with the anhydrous calcium chloride to obtain a cemented mud with an enhanced cementation ability, and the pH of the cemented mud is 8.0, and the cemented mud is maintained for 30 min After the maintaining of the cemented mud, 250 g of the phosphoric acid modified sepiolite and 450 g of potassium dihydric phosphate are added into the cemented mud and stirred for 20 min, then the cemented mud added with the phosphoric acid modified sepiolite and the potassium dihydric phosphate is maintained for 30 min, followed by performing pressure filtering to stabilize the neutralization slag.

The neutralization slags before and after the stabilization are respectively sampled and tested, and a toxicity leaching experiment is carried out. A uranium concentration and a pH value of the leaching solution are shown in Table 1. Water leaching and acid leaching refer to "Solid waste-Extraction procedure for leaching toxicity-Horizontal vibration method" HJ 557-2010 and "Solid waste-Extraction procedure for leaching toxicity-Sulphuric acid & nitric acid method" HJ 299-2007, respectively. It can be seen from Table 1, before the stabilization, the concentration of uranium in the water leaching is 1.055 mg/L with the pH of 8.0, and the concentration of uranium in the acid leaching is 1.213 mg/L with the pH of 7.9. After the stabilization, the concentration of uranium in water leaching is 0.016 with the pH of 8.0, the concentration of uranium in acid leaching is 0.023 mg/L with the pH of 7.7.

TABLE 1

Analysis of leaching concentration and remediation efficiency

| test items | Before stabilization | | After stabilization (Embodiment 1) | | After stabilization (Embodiment 2) | | Standard concentration limit |
| --- | --- | --- | --- | --- | --- | --- | --- |
| | water leaching | acid leaching | water leaching | acid leaching | water leaching | acid leaching | |
| pH | 8.0 | 7.9 | 7.8 | 7.6 | 8.0 | 7.7 | 6-9 |
| Uranium (mg/L) | 1.055 | 1.213 | 0.024 | 0.036 | 0.016 | 0.023 | 0.3 |

Figure 2:
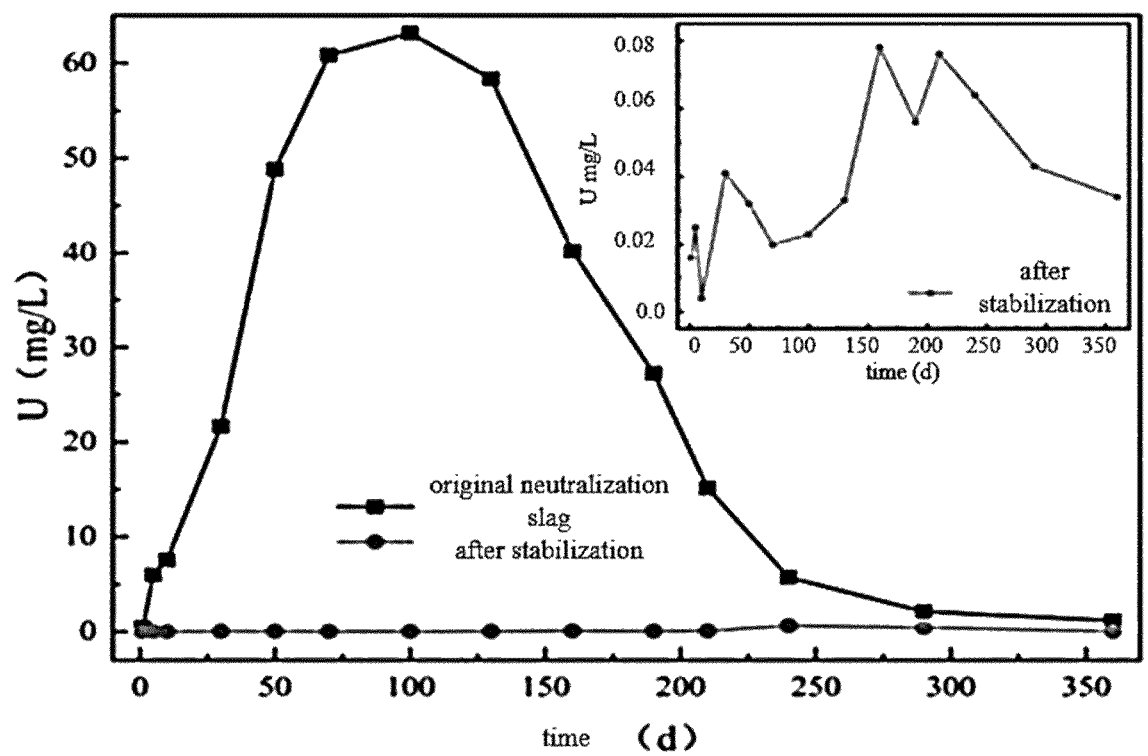
FIG. 2 illustrates a schematic view showing a change of U concentration in an intermittent leaching experiment of neutralization slag before and after stabilization in an embodiment 2 of the disclosure.
Figure 3:
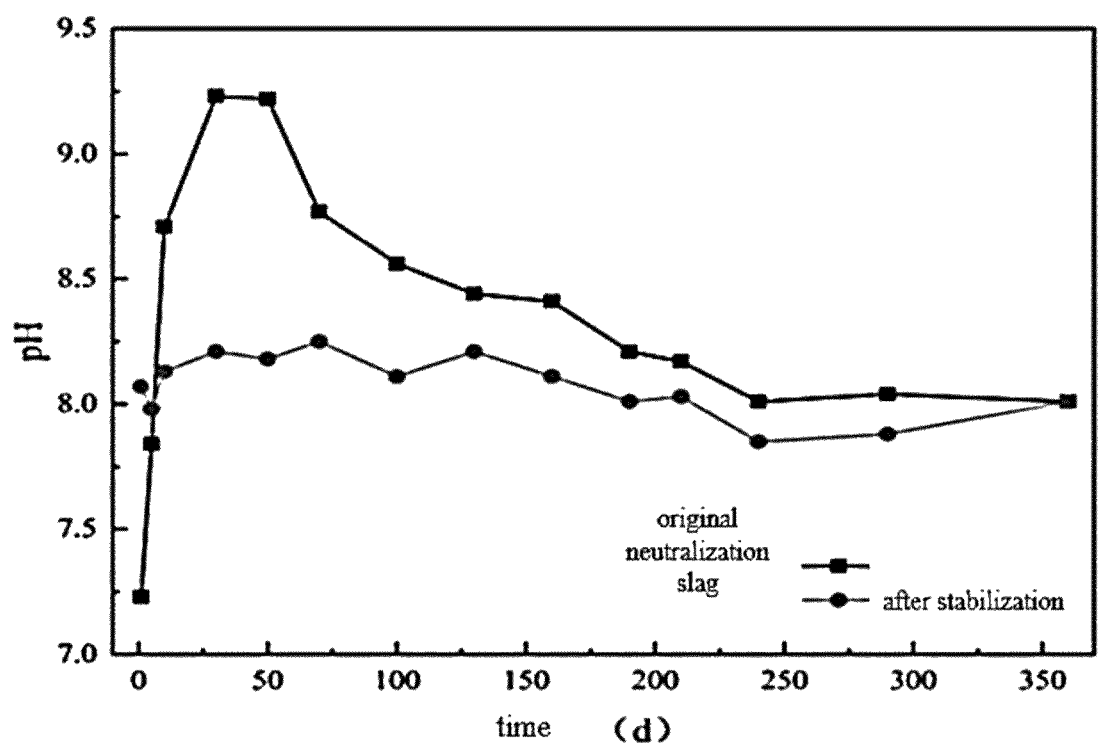
FIG. 3 illustrates a schematic view showing a change of pH value in an intermittent leaching experiment of neutralization slag before and after stabilization in the embodiment 2 of the disclosure.

An intermittent leaching experiment of the stabilized neutralization slag is carried out. The leachate is simulated rainwater (acid leaching solution with the pH of 5.6), and the neutralization slag of raw material is a control group. As shown in FIG. 2, the concentration of the uranium in the leachate of the control group is increased first and then decreased and finally maintained at about 1.0 mg/L within 360 days. The highest concentration of the uranium in the leachate is 63.174 mg/L. The pH change is similar to that of the uranium (as shown in FIG. 3). The pH is increased rapidly to 9.25 at the beginning of the leaching, and then decreased to about 8.0. The uranium leaching concentration of the neutralization slag stabilized by the method of the disclosure has been maintained at a low level, which is far lower than the emission standard of 0.3 mg/L. The pH change is small (as shown in FIG. 3), and the buffering effect on the leachate is strong.

The stabilization agent described in the disclosure has an excellent stabilizing effect on the neutralization slag of uranium associated zirconium and zirconia. As shown in FIG. 1, due to the influence of alkali fusion, acid treatment and other processes to the raw neutralization slag, the uranium occurrence form of the raw neutralization slag changes significantly, the residual uranium is released in large quantities, and the content of oxidizable and weak acid extractable uranium is increased significantly. After the addition of the stabilization agent, the content of residual uranium is increases greatly, and uranium is stabilized in the solid phase of the waste residue, resulting in a very low concentration of the uranium in the simulated rainwater leachate, as shown in FIG. 2.

In addition to the above specific embodiments, in other embodiments, volcanic ash, diatomite or amorphous $SiO_2$ can be used to replace nano silica fume, potassium dihydric phosphate can be replaced by calcium biphosphate or ammonium dihydric phosphate, and anhydrous calcium chloride can be replaced by other soluble calcium salts.

What is claimed is:

1. A method for stabilizing a neutralization slag of uranium associated zirconium and zirconia comprising:
    step 1, putting a pretreatment agent into the neutralization slag of uranium associated zirconium and zirconia and stirring evenly for 5-10 minutes (min) to obtain a first mixture; adding water with a weight of 15%-25% that of the neutralization slag to the first mixture and stirring for 10-20 min to obtain a mixed mud, and detecting a potential of hydrogen (pH) of the mixed mud; wherein the pretreatment agent is a second mixture formed by mixing lime and a nano active material according to a weight ratio of 1:1;
    step 2, maintaining the mixed mud for 30 min and then executing step 3 when the pH of the mixed mud exceeds 8.5; otherwise, repeating step 1 until the pH of the mixed mud exceeds 8.5;
    step 3, adding anhydrous calcium chloride into the mixed mud obtained from step 2 and stirring for 10-20 min, sprinkling water on the mixed mud added with the anhydrous calcium chloride to obtain a cemented mud with a moisture content of 15%-25%, and controlling a pH of the cemented mud in a range of 7.5 to 8 and maintaining for 30 min; and
    step 4, adding phosphoric acid modified sepiolite and dihydric phosphate into the cemented mud after the maintaining, stirring for 10-20 min and maintaining for 30 min, followed by performing pressure filtering to stabilize the neutralization slag;
    wherein a preparation method of the phosphoric acid modified sepiolite in step 4 comprises:
    adding a sepiolite powder grinded to 200 meshes into a phosphoric acid solution of 5%-10% volume of fraction, wherein a solid-liquid ratio of the sepiolite powder and the phosphoric acid solution is 1:50 gram per milliliter (g/mL); stirring the phosphoric acid solution added with the sepiolite powder for 30 min until bubbles completely disappear, followed by aging for 60 min and filtering out a supernatant to obtain a first solid; adding the first solid into deionized water, then stirring and dispersing for 20 min to obtain a solution; adjusting a pH of the solution to a range of 4 to 5 by using ammonia water to obtain an adjusted solution, standing the adjusted solution for 30 min and filtering out a supernatant of the adjusted solution to obtain a second solid, and drying and refining the second solid to obtain the phosphoric acid modified sepiolite with a 100 mesh sieve.

2. The method for stabilizing the neutralization slag of uranium associated zirconium and zirconia as claimed in claim 1, wherein the dihydric phosphate in step 4 comprises at least one of potassium dihydric phosphate, calcium biphosphate and ammonium dihydric phosphate.

3. The method for stabilizing the neutralization slag of uranium associated zirconium and zirconia as claimed in claim 1, wherein the nano active material in step 1 comprises silica fume, volcanic ash, kieselguhr or amorphous silica ($SiO2$).

4. The method for stabilizing the neutralization slag of uranium associated zirconium and zirconia as claimed in claim 1, wherein a weight ratio of the pretreatment agent in step 1:the anhydrous calcium chloride in step 3:the phosphoric acid modified sepiolite in step 4:the dihydric phosphate in step 4 is 2-8:2-6:3-5:4-9; and a weight ratio of the pretreatment agent and the neutralization slag of uranium associated zirconium and zirconia is 2-8:100.

5. A stabilization agent for stabilizing a neutralization slag of uranium associated zirconium and zirconia, comprising the following components in parts by weight:
    a pretreatment agent of 2-8 parts;
    anhydrous calcium chloride of 2-6 parts;
    phosphoric acid modified sepiolite of 3-5 parts;
    dihydric phosphate of 4-9 parts;
    wherein the pretreatment agent is a mixture formed by mixing lime and a nano active material according to a weight ratio of 1:1;
    wherein a preparation method of the phosphoric acid modified sepiolite comprises:
    adding a sepiolite powder grinded to 200 meshes into a phosphoric acid solution of 5%-10% volume of fraction, wherein a solid-liquid ratio of the sepiolite powder and the phosphoric acid solution is 1:50 g/mL; stirring the phosphoric acid solution added with the sepiolite powder for 30 min until bubbles completely disappear, followed by aging for 60 min and filtering out a supernatant to obtain a first solid; adding the first solid into deionized water, then stirring and dispersing for 20 min to obtain a solution; adjusting a pH of the solution to a range of 4 to 5 by using ammonia water to obtain an adjusted solution, standing the adjusted solution for 30 min and filtering out a supernatant of the adjusted solution to obtain a second solid, and drying and refining the second solid to obtain the phosphoric acid modified sepiolite with a 100 mesh sieve.

6. The stabilization agent as claimed in claim 5, wherein a method for stabilizing the neutralization slag of uranium associated zirconium and zirconia comprises:
    gradually adding the pretreatment agent, the anhydrous calcium chloride, the phosphoric acid modified sepiolite and the dihydric phosphate into the neutralization slag of uranium associated zirconium and zirconia to obtain a mixture; inducing uranium in the mixture to form an insoluble uranium, and stabilizing the insoluble uranium in the neutralization slag through synergy-cementation-adsorption-mineralization to stabilize the neutralization slag.

7. The stabilization agent as claimed in claim 5, wherein a weight ratio of the pretreatment agent and the neutralization slag of uranium associated zirconium and zirconia is 2-8:100.

* * * * *